US012713240B2

(12) United States Patent
Khare et al.

(10) Patent No.: US 12,713,240 B2
(45) Date of Patent: Aug. 18, 2026

(54) SECURE IDENTIFICATION OF APPLICATIONS IN COMMUNICATION NETWORK

(71) Applicant: Nokia Technologies Oy, Espoo (FI)

(72) Inventors: Saurabh Khare, Bangalore (IN); Rainer Liebhart, Munich (DE); Bo Holm Bjerrum, Aalborg (DK)

(73) Assignee: Nokia Technologies Oy, Espoo, FL (US)

(*) Notice: Subject to any disclaimer, the term of this patent is extended or adjusted under 35 U.S.C. 154(b) by 373 days.

(21) Appl. No.: 18/446,427

(22) Filed: Aug. 8, 2023

(65) Prior Publication Data

US 2024/0056815 A1 Feb. 15, 2024

(30) Foreign Application Priority Data

Aug. 9, 2022 (IN) ............................ 202241045414

(51) Int. Cl.

| | |
|---|---|
| ***H04W 12/10*** | (2021.01) |
| ***H04L 9/40*** | (2022.01) |
| ***H04W 12/06*** | (2021.01) |
| ***H04W 12/60*** | (2021.01) |

(52) U.S. Cl.

CPC ......... *H04W 12/10* (2013.01); *H04L 63/0807* (2013.01); *H04W 12/06* (2013.01); *H04W 12/66* (2021.01)

(58) Field of Classification Search

CPC ..... H04W 12/10; H04W 12/06; H04W 12/66; H04W 12/068; H04W 40/04; H04L 63/0807; H04L 9/0861; H04L 2209/805; H04L 45/0377; H04L 9/805

See application file for complete search history.

(56) References Cited

U.S. PATENT DOCUMENTS

| | | | | |
|---|---|---|---|---|
| 12,294,929 | B2 * | 5/2025 | Schumacher | H04W 40/02 |
| 2015/0047003 | A1 * | 2/2015 | Khan | H04L 63/08 726/7 |
| 2021/0168594 | A1 * | 6/2021 | Wu | H04W 88/16 |

(Continued)

FOREIGN PATENT DOCUMENTS

| | | |
|---|---|---|
| WO | 2022/121696 A1 | 6/2022 |

OTHER PUBLICATIONS

"3rd Generation Partnership Project; Technical Specification Group Services and System Aspects; Security architecture and procedures for 5G system (Release 17)", 3GPP TS 33.501, V17.6.0, Jun. 2022, pp. 1-292.

(Continued)

*Primary Examiner* — Jinsong Hu

(74) *Attorney, Agent, or Firm* — Lippes Mathias LLP

(57) ABSTRACT

Techniques for securely identifying applications in a communication network are disclosed. For example, a method comprises receiving, at user equipment, a data item associated with an application program that is installed or being installed on the user equipment. The method further comprises storing, by the user equipment, the data item with an identifier of the application program. The method still further comprises utilizing, by the user equipment, the stored data item when deciding to apply a route selection rule for data traffic associated with the application program.

10 Claims, 3 Drawing Sheets

(56) References Cited

U.S. PATENT DOCUMENTS

2021/0185529 A1* 6/2021 Patil ........................ H04W 8/04
2022/0386123 A1* 12/2022 Sangai .................... H04L 63/18

OTHER PUBLICATIONS

"New Study to enable URSP rules to securely identify Applications (FS_USIA)", 3GPP TSG-SA3 Meeting #107-e, S3-221071, Agenda: 6, Lenovo, May 16-20, 2022, 3 pages.
"3rd Generation Partnership Project; Technical Specification Group Services and System Aspects; Policy and charging control framework for the 5G System (5GS); Stage 2 (Release 17)", 3GPP TS 23.503, V17.5.0, Jun. 2022, pp. 1-148.
"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.
"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.
"3rd Generation Partnership Project; Technical Specification Group Services and System Aspects; Study to enable URSP rules to securely identify Applications (FS_USIA) (Release 18)", 3GPP TR 33.892, V1.0.0, Mar. 2023, 16 pages.
Extended European Search Report received for corresponding European Patent Application No. 23190489.7, dated Jan. 12, 2024, 8 pages.
"Discussion on applying URSP rules for Authentic Applications", 3GPP TSG-SA3 Meeting #106-e, S3-220382, Agenda: 4.18, Lenovo, Feb. 14-25, 2022, 2 pages.
Notice of Allowance received for corresponding European Patent Application No. 23190489.7, dated Mar. 13, 2025, 6 pages.
Notice of Allowance received for corresponding European Patent Application No. 23190489.7, dated Oct. 21, 2024, 7 pages.

* cited by examiner

SECURE IDENTIFICATION OF APPLICATIONS IN COMMUNICATION NETWORK

FIELD

The field relates generally to communication networks, and more particularly, but not exclusively, to security management in such communication networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with access to application programs (applications) can present a significant challenge.

SUMMARY

Illustrative embodiments provide techniques for securely identifying applications in a communication network.

For example, in one illustrative embodiment, a method comprises receiving, at user equipment, a data item associated with an application program that is installed or being installed on the user equipment. The method further comprises storing, by the user equipment, the data item with an identifier of the application program. The method still further comprises utilizing, by the user equipment, the stored data item when deciding to apply a route selection rule for data traffic associated with the application program.

In further illustrative embodiments, in response to receiving another data item (i.e., a received data item) and a route selection rule (i.e., a received route selection rule) in conjunction with the identifier of the application program, utilizing the stored data item may further comprise: performing, by the user equipment, a verification operation comprising the received data item and the stored data item; applying, by the user equipment, the received route selection rule for data traffic associated with the application program when a match occurs in the verification operation; and rejecting, by the user equipment, the received route selection rule for data traffic associated with the application program when a match fails to occur in the verification operation.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide for ensuring the identity of a genuine application in order to apply one or more user equipment route selection rules accordingly, so that malicious applications cannot spoof the user equipment and thus gain access to operator-regulated resources.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other details that one of ordinary skill in the art will realize. For example, TS 23.503 entitled, "Technical Specification Group Services and System Aspects; Policy and Charging Control Framework for the 5G System (5GS)," the disclosure of which is incorporated by reference herein in its entirety, may also be mentioned below in the context of some illustrative embodiments. However, while well-suited for 5G-related 3GPP standards, embodiments are not necessarily intended to be limited to any particular standards.

Prior to describing illustrative embodiments, a general description of certain main components of a 5G network will be described below in the context of FIGS. 1 and 2.

Figure 1:
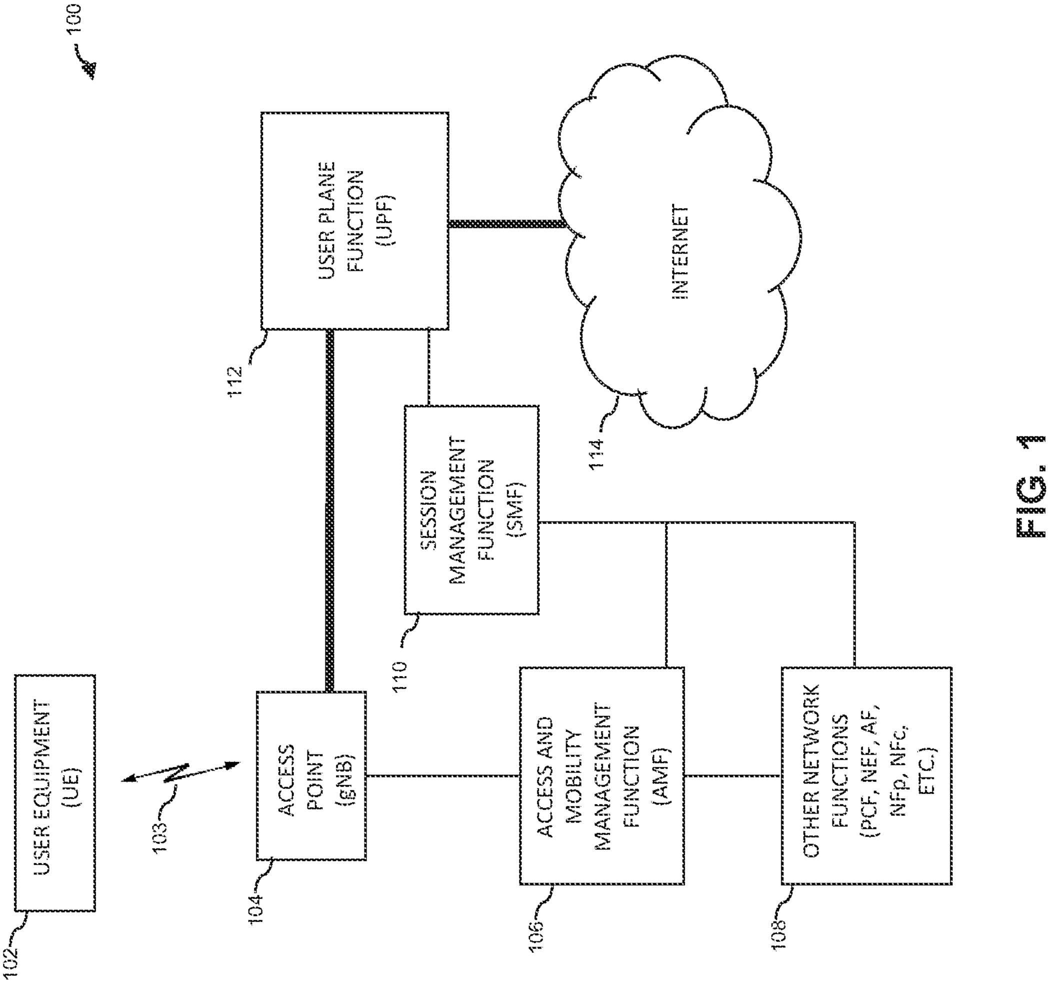
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., control plane functions, user plane functions, etc. As such, the blocks shown in FIG. 1 reference specific elements in 5G networks that provide some of these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network, an untrusted non-3GPP access network that uses an N3IWF (Non-3GPP Interworking Function), a trusted non-3GPP network that uses a TNGF (Trusted Non-3GPP Gateway Function) or wireline access that uses a W-AGF (Wireline Access Gateway Function) or may correspond to a legacy access point (e.g., eNB).

The UE 102 may be a mobile station, and such a mobile station may comprise, by way of example, a mobile telephone, a computer, an IoT device, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one illustrative embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions. Alternative illustrative embodiments may not use UICC-based authentication, e.g., an Non-Public (Private) Network (NPN).

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations.

Further, the access point 104 in this illustrative embodiment is operatively coupled to an Access and Mobility Management Function (AMF) 106. In a 5G network, the AMF supports, inter alia, mobility management (MM) and security anchor (SEAF) functions.

AMF 106 in this illustrative embodiment is operatively coupled to (e.g., uses the services of) other network functions 108. As shown, some of these other network functions 108 include, but are not limited to, a Policy Control Function (PCF), a Network Exposure Function (NEF), and an Application Function (AF). The PCF is a control plane function within the 5G core (5GC) network that uses policy subscription information to provide policy rule management functionality. The AF is a control plane function within the 5GC network that provides application services to the subscriber (UE), e.g., a video streaming service. If the AF is trusted, it can interact directly with 5GC network functions; otherwise, if it is a third party service, then the AF interacts with the NEF. In either case, the AF is also sometimes referred to as the "application server." The NEF is a control plane function within the 5GC network that securely exposes network capabilities and events associated with other network functions to the AF.

Other network functions 108 may include network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. Alternatively the UE, such as UE 102, may receive services from an NPN where these functions may reside. The HPLMN is also referred to as the Home Environment (HE). If the UE is roaming (not in the HPLMN), it is typically connected with a Visited Public Land Mobile Network (VPLMN) also referred to as a visited network, while the network that is currently serving the UE is also referred to as a serving network. In the roaming case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not necessarily limited by which functions reside in which PLMN (i.e., HPLMN or VPLMN).

The access point 104 is also operatively coupled (via one or more of functions 106 and/or 108) to a Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) are logical networks that provide specific network capabilities and network characteristics that can support a corresponding service type, optionally using network function virtualization (NFV) on a common physical infrastructure. With NFV, network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
FIG. 2 illustrates user equipment and network entities with which one or more illustrative embodiments may be implemented.
Figure 2:
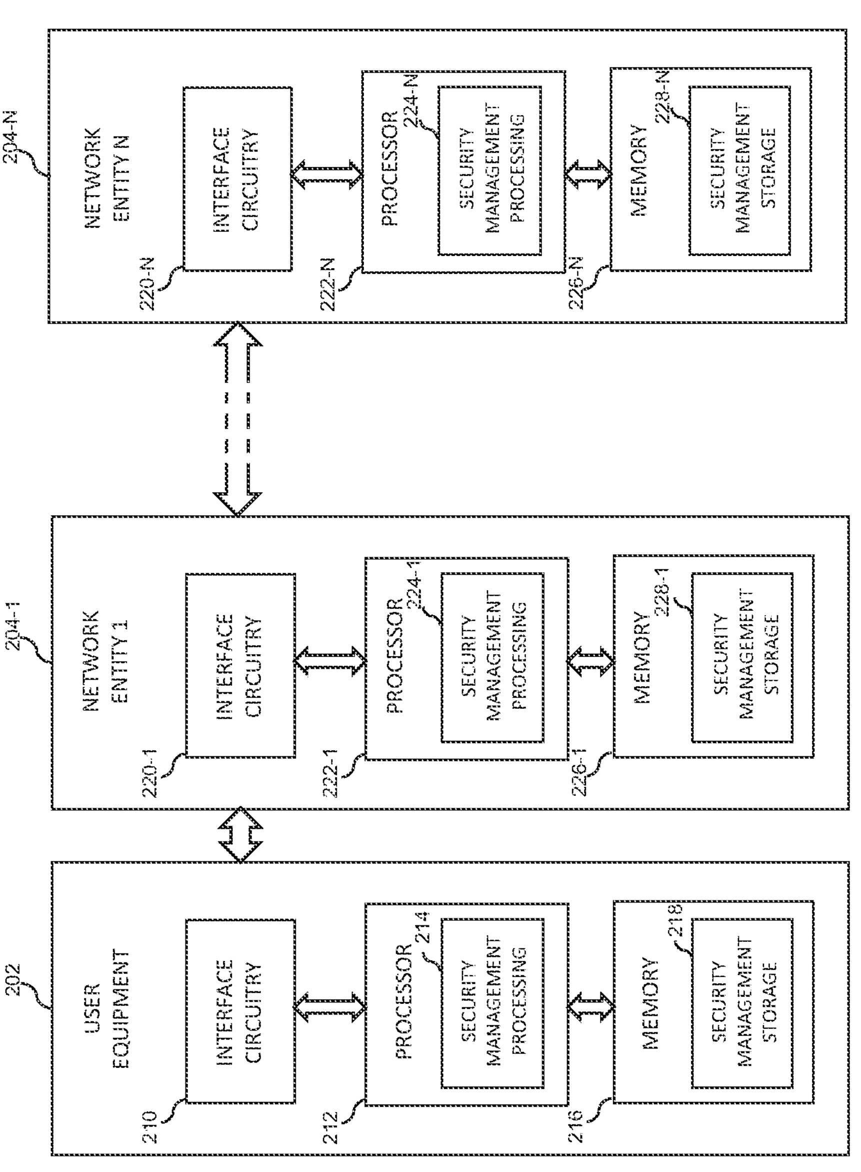

FIG. 2 is a block diagram illustrating computing architectures for various participants in methodologies according to illustrative embodiments. More particularly, system 200 is shown comprising user equipment (UE) 202 and a plurality of network entities 204-1, . . . , 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, tokens, secrets, security management messages, registration request/response messages and data, request/response messages, authentication request/response messages and data, metadata, control data, audio, video, multimedia, consent data, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G core network architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces).

Given the above general description of some features of a 5GC network, problems with existing application identification security approaches in the context of a UE route selection policy, and solutions proposed in accordance with illustrative embodiments, will now be described herein below.

UE route selection policy (URSP) is typically used by the UE, inter alia, to determine if a detected application can be associated with an established protocol data unit (PDU) session, offloaded to non-3GPP access outside a PDU session, or trigger the establishment of a new PDU session. A 5GC network can be configured to connect a UE to one or more external data networks that each may comprise one or more application servers. The connectivity service is referred to as the PDU session. The 5GC network interacts with the one or more application servers via one or more AFs. Typically, the application server is configured to operate with an application program (i.e., application) resident on the UE. One non-limiting example is a video streaming service scenario wherein the subscriber downloads and views video content from an application server using an video streaming service application loaded on a smart phone or other wireless streaming device (UE) of the subscriber.

However, concerns have been realized with the security of the applications with which the UE engages and, in particular, within the context of URSP functionalities. More particularly, it is realized that a 5G-capable UE can be configured with a plurality of URSP rules. For example, in accordance with the above-referenced TS 23.503, URSP rules may include definitions of data connection parameters that can identify, for example: (i) the name of the external data network (e.g., Data Network Name, DNN) reachable via the data connection; (ii) a network slice utilized by the data connection (e.g., S-NSSAI); (iii) the radio access network type utilized by the data connection (e.g., 3GPP access or non-3GPP access); (iv) the Internet Protocol (IP) type utilized by the data connection (e.g., IPv4 or IPv6); and/or (v) the session and service continuity type (e.g., SSC type) provided by the data connection. Further, URSP rules can map the different traffic flows generated in the UE into different data connections, each one utilizing different data connection parameters. Still further, as part of the traffic descriptors, URSP rules can contain application descriptors which consist of OSId and OSAppId(s). OSId (operating system identifier) is an identifier identifying the operating system. OSAppId (operating system-specific application identifier) is an identifier associated with a given application and uniquely identifying the application within the UE for a given operating system. As illustratively used herein, the operating system (OS) is a collection of UE software that provides common services for applications.

Thus, in order to identify the traffic generated by an application, the traffic descriptor component of the URSP rule may comprise the identity of the application in the form of OSAppID. However, OSAppID is not a secure identifier, i.e., it cannot securely identify an application. It is possible that another application is (maliciously) designed to apply the same application identifier as the application identifier of the genuine application. The operating system is not able to detect this so-called application spoofing. In this manner, the other application pretends to be the genuine application and can cause the UE to transmit its traffic based on a URSP rule that was designed to be applied solely for the traffic of the genuine application.

By way of example only, assume a malicious user designs an application "NetflixABC" and uses the well-known operating system (e.g., Android) application identifier "Netflix" of the genuine application. When NetflixABC wants to create a PDU session, NetflixABC sends the traffic to the UE layer (e.g., 3GPP modem portion of the UE) with App Id="Netflix". In this case, the UE applies the URSP rule created for the genuine application because it only confirms that the application identifier associated with the application making the PDU session request matches the application identifier of the genuine application, i.e., App Id is "Netflix". Thus, the malicious application NetflixABC is able to fake the UE into thinking it is the genuine application (e.g., referred to as "application spoofing").

Illustrative embodiments overcome the above and other drawbacks with application identity security management by providing techniques to ensure the identity of a genuine application in order to apply the URSP rule accordingly, so that malicious applications cannot obtain access to operator-regulated resources or otherwise engage in application spoofing and/or other malicious activities.

Figure 3:
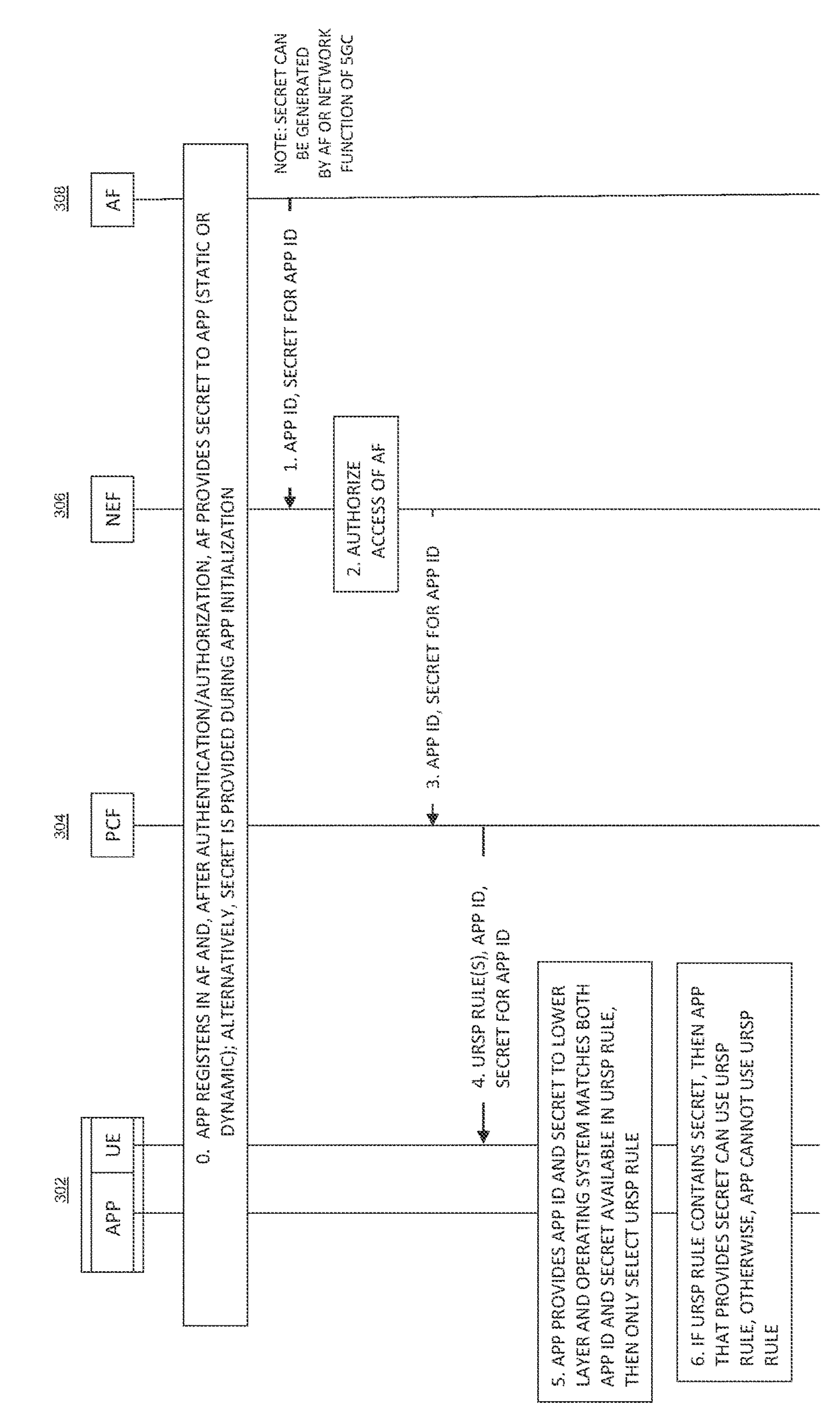
FIG. 3 illustrates a procedure for securely identifying applications in a communication network according to an illustrative embodiment.

FIG. 3 illustrates a procedure 300 for securely identifying applications in a communication network according to an illustrative embodiment. More particularly, procedure 300 involves a UE 302, a PCF 304, an NEF 306, and an AF 308. UE 302 is depicted as the UE itself and an application program (APP) resident on UE 302.

In this illustrative embodiment, it is assumed that an application service provider of the APP at UE 302 has a trust relationship with the network operator and can provide additional application-specific information to the operator and UE 302 in a secure manner. AF 308 is in the domain of the application service provider while NEF 306 and PCF 304 are part of the network operator domain (i.e., 5GC network). Procedure 300 comprises an illustrative embodiment without encryption where a token is managed by AF 308.

In step 0, the APP is installed at UE 302 and registers with AF 308 (application server). While registering, a secure tunnel is established to secure the communication between the APP at UE 302 and AF 308. Once the APP and AF 308 have mutually authenticated, AF 308 provides a data item to the APP which is stored (i.e., generally referred to herein as the stored data item). The data item comprises a secret which may be static (not change, i.e., permanent) or dynamic (change after some time period and/or event occurrence, i.e., temporary).

In some illustrative embodiments, the secret comprises a token which can be time-based (i.e., valid for a given time period and invalid any other time) or unlimited (i.e., not time-based and thus indefinitely valid), depending on a policy of AF 308. Alternatively or additionally, the secret can comprise a trust-based value called a Root of Trust (RoT) which can be used to derive one or more tokens or one-time pads (OTPs). An OTP is a random pre-shared secret key that is typically not smaller than the message being encrypted. Alternatively, the secret (e.g., token and/or RoT) can be generated when the APP is downloaded from an application source (e.g., an online application store accessible by UE 302) and installed on UE 302 together with the APP. Further, the secret can be UE-specific, user-specific, or just application-specific.

In step 1, once the secret (e.g., assuming a token/RoT) has been provided to the APP at UE 302, AF 308 updates the URSP rule for the APP with the given or generated token based on the RoT. This can be accomplished by AF 308 calling an application programming interface (API) of NEF 306 to provision the token for APP (identified by APP ID) as part of URSP rule data to the network. An example of a provided/generated token is as follows:

Token=KDF(RoT,Seed)

where KDF is a key derivation function, and Seed is a random number exchanged during step 0.

In the following steps, the token can be either a provided (exchanged) token or a generated token.

In step 2, NEF 306 approves the request using an access authorization mechanism established by the 5GC network.

In steps 3 and 4, NEF 306 invokes a PCF service of PCF 304 to provision the URSP rule including the token for UE 302. PCF 304 provisions the URSP rule including the token on UE 302.

UE 302 stores the URSP rule and considers the URSP rule secure. If the URSP rule is provisioned with a token, UE 302 uses the URSP rule only if the APP provides an APP ID and the corresponding token. Otherwise, UE 302 does not use this URSP rule.

In illustrative embodiments, procedure 300 has no effect on backward compatibility where URSP rules are stored without a token, i.e., a URSP rule without a token works as it is (APP-provided token is ignored by UE 302).

When the APP wants to generate traffic, it sends an indication to the UE 302 with the APP ID and the secret (i.e., generally referred to herein as the received data item).

More particularly, in steps 5 and 6, UE 302 locates the URSP rule that corresponds to the APP ID. When the URSP rule is configured with a token, UE 302 matches the APP token with the URSP token. When both provided and stored token match, UE 302 uses the URSP rule. Otherwise, UE 302 shall not use this URSP rule.

When the token is time-bounded, and has expired, AF 308 provisions the URSP rule with a new token and provides the new token (secret) to the APP on UE 302.

In some illustrative embodiments of steps 5 and 6, the token can be further derived to a one-time pad, implying that the pad will only be used once, and each request will contain a new pad which is generated in the APP and modem (UE policy enforcement point). This ensures that replay of the pad is not possible. The pad can be generated as follows:

PAD=KDF(token,count)

where count is a counter which is incremented for each request containing the pad. The initial count can be exchanged in step 0.

Both APP and UE 302 generate the PAD either for proof or verification.

In an alternative to procedure 300, wherein the token (secret) is managed by the 5GC network, AF 308 informs the 5GC network that the URSP rule needs to be secured. The token is then generated by the 5GC network and provisioned on UE 302 along with the new or modified URSP rule. AF 308 can retrieve the token from the 5GC network and provide it to the APP (e.g., during the next regular APP update on UE 302).

It is to be appreciated that, in alternative illustrative embodiments, the data item (e.g., secret, token, etc.) can be downloaded to the application program on the UE (APP) by one or more mechanisms, protocols, networks, etc. outside of a 3GPP network.

As used herein, it is to be understood that the term "communication network" in some embodiments can comprise two or more separate communication networks. Further, the particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

The invention claimed is:

1. A user equipment comprising:

at least one processor and at least one memory storing instructions that, when executed by the at least one processor, cause the user equipment to perform operations, the operations comprising:

receiving, from a communication network, via a secure channel established between the user equipment and the communication network, a data item associated with an application program that is installed or being installed on the user equipment, wherein the data item comprises a secret;

storing the data item in association with an identifier of the application program;

receiving, from the communication network, a route selection rule for data traffic associated with the application program, the route selection rule comprising another data item, wherein the another data item comprises another secret; and applying the route selection rule for data traffic associated with the application program when the secret matches the another secret; or rejecting the route selection rule for data traffic associated with the application program when the secret does not match the another secret.

2. The user equipment of claim 1, wherein the data item comprising the secret is generated by: (i) an application server associated with the application program; or (ii) a network entity of a communication network connecting the user equipment and the application server.

3. The user equipment of claim 1, wherein the secret comprises a security token, wherein the security token is static or dynamic, and wherein the another secret comprises another security token that is static or dynamic.

4. The user equipment of claim 1, wherein the secret comprises a trust-based value, and wherein the another secret comprises another trust-based value.

5. The user equipment of claim 4, wherein the trust-based value is useable to compute a security token or a one-time pad.

6. A method comprising:

receiving, at user equipment from a communication network via a secure channel established between the user equipment and the communication network, a data item associated with an application program that is installed or being installed on the user equipment, wherein the data item comprises a secret;

storing, by the user equipment, the data item in association with an identifier of the application program; and receiving, by the user equipment from the communication network, a route selection rule for data traffic associated with the application program, the route selection rule comprising another data item, the another data item comprising another secret; and applying, by the user equipment, the route selection rule for data traffic associated with the application program when the secret matches the another secret; or rejecting, by the user equipment, the route selection rule for data traffic associated with the application program when the secret does not match the another secret.

7. The method of claim 6, wherein the data item comprising the secret is generated by: (i) an application server associated with the application program; or (ii) a network entity of a communication network connecting the user equipment and the application server.

8. The method of claim 6, wherein the secret comprises a security token, wherein the security token is static or dynamic, and wherein the another secret comprises another security token that is static or dynamic.

9. The method of claim 6, wherein the secret comprises a trust-based value, and wherein the another secret comprises another trust-based value.

10. The method of claim 9, wherein the trust-based value is useable to compute a security token or a one-time pad.

* * * * *